United States Patent [19] [11] 3,720,876
Montgomery, deceased [45] March 13, 1973

[54] TOUCH-BUTTON ACTUATED ELECTRONIC LATCHING DEVICE WITH MEANS FOR ENSURING LATCH OPERATION UPON THE APPLICATION OF POWER

[75] Inventor: Andrew P. Montgomery, deceased, late of Glenside, Pa. by Ann P. Montgomery, executrix

[73] Assignee: Philco-Ford Corporation, Philadelphia, Pa.

[22] Filed: April 28, 1971

[21] Appl. No.: 138,211

[52] U.S. Cl. ..................325/465, 325/455, 325/464, 325/468, 334/29, 334/87

[51] Int. Cl. ..............................................H04b 1/06

[58] Field of Search......325/452, 455, 457, 458, 459, 325/462, 463, 464, 465, 468, 469; 334/15, 16, 26, 29, 46, 55, 78, 87

[56] References Cited

UNITED STATES PATENTS

| | | | |
|---|---|---|---|
| 3,503,018 | 3/1970 | Cavanagh | 325/464 |
| 3,560,858 | 2/1971 | Sakai et al. | 325/464 |

*Primary Examiner*—Albert J. Mayer
*Attorney*—Robert D. Sanborn

[57] ABSTRACT

An improvement in the circuits used in touch-button operated electronic latches for tuning voltage variable capacitor tuned UHF television tuners. When a bank of electronic latches operating from a common power source is first energized by the application of input power, all latches will remain in the off state. In the case of a television receiver no signal will be received and the picture and sound displays will contain only noise. The improvement here is the inclusion of circuits that ensure the operation of one latch when power is first applied. This means that when the receiver is first energized it will be tuned to an occupied channel.

6 Claims, 2 Drawing Figures

INVENTOR.
ANDREW P. MONTGOMERY, DECEASED,
BY ANN P. MONTGOMERY, EXECUTRIX
BY Gail W. Woodward
AGENT INVENTOR.
ANDREW P. MONTGOMERY,
DECEASED,
BY ANN P. MONTGOMERY,
EXECUTRIX
BY Gail W. Woodward
AGENT

TOUCH-BUTTON ACTUATED ELECTRONIC LATCHING DEVICE WITH MEANS FOR ENSURING LATCH OPERATION UPON THE APPLICATION OF POWER

BACKGROUND OF THE INVENTION

Voltage variable capacitor (VVC) tuning elements have been incorporated into television tuners and have substantially improved such tuners, particularly those covering the UHF portion of the spectrum. The tuners have been made more compact, less subject to mechanical shock and vibration, and the mechanical tuning function can be performed remotely with a potentiometer and regulated voltage source. In addition a bank of touch-buttons can be associated with a bank of potentiometers by means of latching circuits so that fully electronic touch-button control can be achieved.

When an ordinary electronic-latching touch-button control is applied to a UHF television tuner, switching to VHF or turning the set off will deenergize all of the latches. Then when the set is switched on, or from VHF to UHF, none of the latches will be energized until a touch-button is activated. In the interim, and in the absence of the present invention, the receiver is untuned and no signal is received — resulting in the reproduction of a fairly high level of noise only, both in the picture display and sound output. This objectionable characteristic could be avoided if one channel were energized when switching to UHF or turning the set on, even though the particular channel is not the intended one.

DESCRIPTION OF THE PREFERRED PRACTICE OF THE INVENTION

Figure 1:
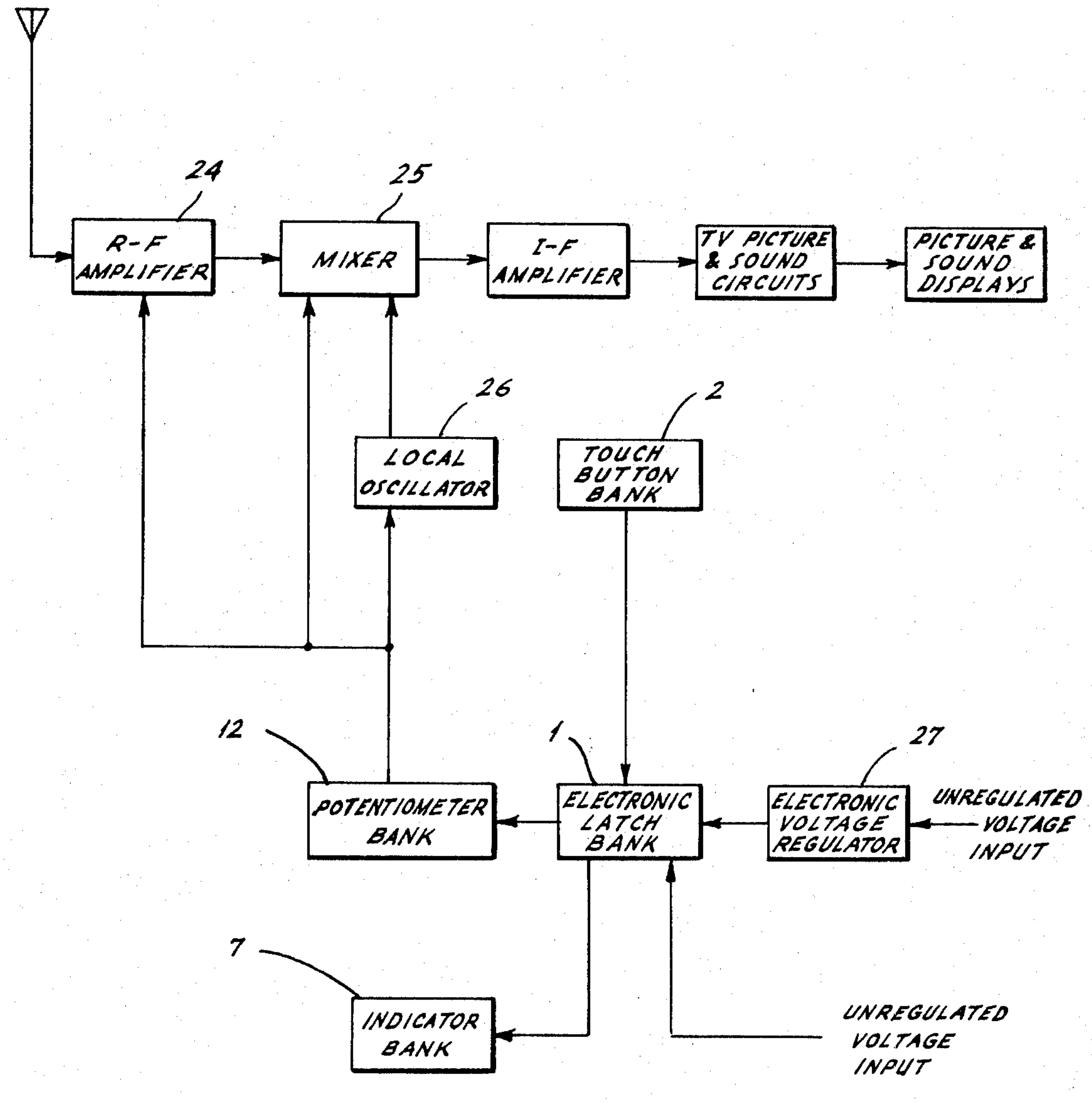
FIG. 1 is a block diagram of a television receiver of a type suitable for use with the invention.

In the block diagram of FIG. 1 a television receiver is portrayed having touch-button operated VVC tuning. The showing is intended to portray UHF operation. A bank of touch-buttons 2 operate a bank of electronic latches 1 which energize a bank of potentiometers 12. Each touch-button is associated with an electronic latch and a potentiometer which is energized from a regulated power supply 27. The potentiometer is the tuning device for the receiver.

This single variable voltage is used to tune the UHF tuner by way of its VVC elements. Ordinarily three such elements are used in each tuner. The tuned circuits of mixer 25, r-f amplifier 24 and local-oscillator 26 are tuned with a set of three semiconductor diodes selected so the three circuits track in terms of a single voltage versus tuned frequency. In a superheterodyne the tuning function need only apply to the local oscillator because it, in conjunction with the r-f signal, determines the intermediate frequency or i.f. However it is useful and desirable to have all three circuits track. The i-f amplifier, picture and sound circuits, and displays are conventional and will not be discussed in detail here.

The indicator bank 7 provides means for showing which potentiometer is in use for the tuning function, since only one latching circuit remains "on" at a time. The indicators may be energized from a source of unregulated potential.

Figure 2:
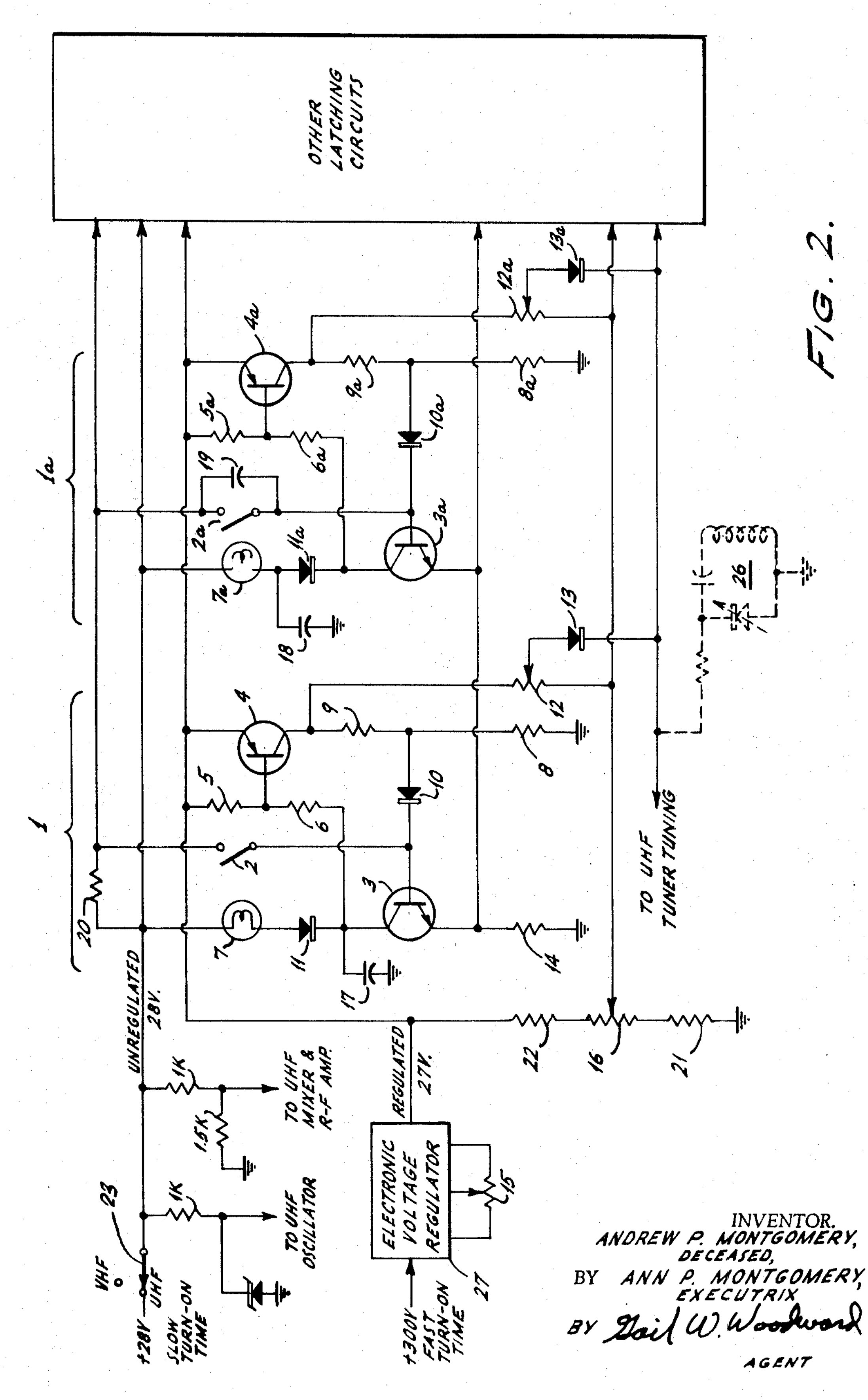
FIG. 2 is a partial schematic diagram of a latching circuit employed in the UHF portion of a television receiver using a touch-button tuning system.

In the schematic of FIG. 2, 1 and 1*a* are electronic latches representing only two of a plurality of such circuits. Commonly six such latches are employed but as many as desired could be used. Latches 1 and 1*a* contain capacitors 17, 18 and 19 to practice the invention and these capacitors do not appear in the other latching circuits. Transistors 3 and 4 are NPN and PNP devices respectively and are connected back to back to form a latching circuit, in a manner well known in the art.

The circuit is energized from two power sources normally used in the television receiver. A low voltage 28-volt source typically used to operate certain transistorized circuits, including the UHF tuner, provides unregulated power. When switch 23 is in the UHF position the UHF tuner and the latching circuits are energized. Regulated power at about 27 volts is provided from the receiver's 300-volt power supply which ordinarily supplies certain vacuum tube circuits. The electronic voltage regulator 27 is conventional and therefore is not discussed in detail. However, a potentiometer 15 (to which reference will be made hereinafter) is shown. Its function is to provide a means for manually adjusting the output voltage of the regulator.

When touch-button momentary contact switch 2 is depressed, the base of transistor 3 is connected through resistor 20 to the 28-volt source. This turns transistor 3 "on" and causes current to flow in resistors 5 and 6. The resulting voltage drop across resistor 5 is such as to turn transistor 4 "on" and current flows through resistors 8 and 9. The voltage drop across resistor 8 is applied through diode 10 to the base of transistor 3 and is of sufficient magnitude to hold transistor 3 in the "on" state even though switch 2 is allowed to open, as it does in normal operation. Part of the collector current of transistor 3 flows through diode 11, which is forward biased for this current, and lights indicator lamp 7 which shows that latch 1 is in the "on" state. Since transistor 4 is "on", potentiometer 12 is connected to the regulated 27-volt source (less a small voltage drop across transistor 4). The arm of potentiometer 12 is coupled to the tuning connection on the UHF tuner through diode 13 which is poled to be forward biased when latch 1 is on. All other coupling diodes such as 13*a* et al. will be back biased thereby decoupling the associated potentiometers 12*a* et al. Thus potentiometer 12 is the mechanical tuning element for the UHF tuner. The voltage at the upper end of potentiometer 12 is set by adjusting potentiometer 15 of voltage regulator 27 to control the magnitude of the regulated voltage. Potentiometer 16, operating with resistors 21 and 22 to form a voltage divider across the 27-volt regulated supply, sets the voltage at the lower end of potentiometer 12. Together potentiometers 15 and 12 function as service adjustments to trim the tuning voltage range and permit tracking the operation of potentiometer 12 with an associated tuning dial or indicator.

Resistor 14, which is common to all of the latching circuits employed, is the turn-off or reset device. Assuming that latch 1 is on and switch 2*a* of latch 1a is pressed, a high positive potential is applied to the base of transistor 3*a* turning it hard "on". This causes an increased positive potential to develop at the emitter of 3*a* and therefore at the emitter of transistor 3 thereby turning it "off". While there is a positive potential at the emitter of transistor 3 due to the conduction of a normally "on" latch, transistor conduction resulting from actuating a touch-button will raise the potential substantially. Turning transistor 3 "off" removes the current through resistors 5 and 6 thereby turning transistor 4 "off". Thus due to the common emitter resistor 14 the actuation of any one latch will turn "off" all other latches in the system.

Capacitor 17, connected from the collector of transistor 3 to ground, is significant to one feature of this invention. When the television receiver is set for UHF operation and turned off all power is removed from the latches. When the receiver is turned back on power will be reapplied and, but for the action of capacitor 17, none of the latches would be turned "on" thereby leaving the set on but not tuned to a channel. In other words the basic latching circuits lack the memory function inherent in mechanically detented tuners.

When power is reapplied to the television receiver, the 300-volt line is energized before the 28-volt line. This is due primarily to a difference in the filter capacitor values customarily provided in such supplies. The filter capacitors in the 28-volt power supply are typically five or more times larger than those in the 300-volt power supply. This is to provide adequate regulation and ripple characteristics but has the added characteristic of slowing the 28-volt turn-on time. Since the 300-volt line supply appears first, the 27-volt regulated voltage appears first and capacitor 17 will start to charge toward 27 volts through resistors 5 and 6. The voltage drop across resistor 5 will turn transistor 4 "on" and cause a voltage to appear at the base of transistor 3 due to the action of resistors 8 and 9 and diode 10. Thus when the 28-volt power appears after a short delay, transistor 3 is in a conductive state and its conduction will then hold transistor 4 on thereby actuating the latch. It is only necessary to make the time constant of capacitor 17 along with resistors 5 and 6 long enough to make the charging interval include the delayed turn-on time of the 28 volt supply. As a result latch 1 will always turn "on" when the receiver is in the UHF position and turned from "off" to "on". Whatever channel potentiometer 12 is set to select will be received.

A different situation exists when the television receiver is "on" and switched from VHF to UHF. Since the 27-volt regulated supply is always on when the receiver is on, capacitor 17 will be charged and will therefore have no effect. To meet this situation capacitors 18 and 19 have been provided in latch 1*a*. When the receiver is switched from VHF to UHF, 28 volts will suddenly be applied via switch 23 to the touch-button switches through resistor 20 (shown above latch 1). This sharp positive transient will be coupled by capacitor 19 to the base of transistor 3*a* thereby turning it "on". Current flows in resistors 5*a* and 6*a* thereby turning transistor 4*a* "on", which in turn holds transistor 3*a* on by the action of resistors 8*a* and 9*a* and diode 10*a*. Capacitor 18, which has a relatively large capacitance, assists in the turn "on" operation by holding the lower terminal of lamp 7*a* at a negative potential with respect to the collector of transistor 3*a* until the switching transient can establish the "on" states of the transistors. Diode 11*a* will be back biased during the transient thereby removing the lamp 7*a* as a load from the latch circuit long enough to permit circuit switching. Thus capacitors 18 and 19 ensure the positive operation of latch 1*a* when the receiver is switched from VHF to UHF and the channel that potentiometer 12*a* has been set for will be energized.

To complete the circuit analysis, diode 10 is present in latch 1 to prevent the switching transient that occurs when switch 2 is depressed from being applied to potentiometer 12. Diode 11 is present to prevent lamp 7 conduction in the event that the 28-volt unregulated voltage falls below the regulated voltage, such as might occur under low power line voltage conditions. Under this condition, without the diode, current could flow from the 28-volt line (now less than 27 volts) through lamp 7 and resistors 5 and 6 to the regulated line. This would tend to turn transistor 4 on even through the latch was not operated. This would apply to all latches, thereby causing false multiple latch turn on. Diode 11 is poled to prevent such reverse current flow.

The following list represents a set of component values that has resulted in successful circuit operation as described above.

Switch 2 — SPST Momentary-contact spring-return
Transistor 3 — Silicon NPN 2N3904
Transistor 4 — Silicon PNP 2N3906
Resistor 5 — 2.2 K ohms 5 percent
Resistor 6 — 33 K ohms 5 percent
Lamp 7 — 28 V 40 ma. Type 1819
Resistor 8 — 6.8 K ohms 5 percent
Resistor 9 — 15 K ohms 5 percent
Diode 10 — Silicon Planar FD–100
Diode 11 — Silicon Planar FD–100
Potentiometer 12 — 50 K ohms linear
Diode 13 — Silicon Planar FD–100
Resistor 14 — 120 ohms
Resistor 16 — 2 K ohms linear
Capacitor 17 — 0.22 mfd
Capacitor 18 — 25 mfd
Capacitor 19 — 47 p fd
Resistor 20 — 270 ohms
Resistor 21 — 82 ohms
Resistor 22 — 5.6 K ohms 5 percent Note: All resistors ¼ watt 20 percent resistance tolerance unless otherwise specified While the above discussion is related to a television receiver, other applications of the invention may be made. In a touch-button operated F M radio receiver there would be no VHF-UHF condition. In this case a single latch memory device would be sufficient. Capacitors 18 and 19 could be omitted and capacitor 17 employed to actuate latch 1 when the receiver is turned on. Also the capacitor could be connected to any other desired latch for the memory function.

In addition, when using a bank of touch-button actuated potentiometers in a television receiver with AFC, a spurious locking action can occur. If AFC action is controlled by a video carrier discriminator there is a possibility of AFC locking on the sound carrier which would lead to spurious operation. This condition could be encountered when switching from a potentiometer adjusted for a higher channel to one adjusted for a lower channel. Since the actual tuning voltage must sweep from one condition to the next, the receiver will sweep downward and the first signal encountered will be the sound carrier. Due to AFC locking, this signal will be the one the receiver automatically receives. To avoid this problem the AFC action can simply be switched off during touch-button manipulation. Alternatively a jogging circuit can be connected to the discriminator output so that whenever a touch-button is actuated the receiver is suddenly tuned too low and then returned to its preset tuning from the low frequency direction. Since the video carrier is the lower carrier frequency correct AFC action is ensured. This latter action is taught and claimed in my copending application Ser. No. 137,484 filed Apr. 26, 1971, now U.S. Pat. No. 3,678,183.

I claim:

1. In a latching system for touch-button actuated potentiometers used in the tuning of voltage variable reactance receiver tuners, the combination comprising:

a. a source of regulated d-c potential;

b. a source of low voltage unregulated d-c potential;

c. a plurality of electronic latching circuits connected to said potential sources, each latching circuit having an off state and an on state and comprising: a momentary contact touch-button switch connected to initiate the on state of said latching circuit, electronic switching means connected to said potential sources and actuated by said touch-button switch, an indicator connected to said switching means and energized through said switching means by said source of unregulated d-c potential, and a potentiometer connected to said switching means and energized through said switching means by said source of regulated d-c potential; and d. means for actuating one of said latching circuits to said on state responsive to the energizing of at least one of said potential sources.

2. The latching system of claim 1 wherein said actuating means includes a first means associated with a first predetermined one of said latching circuits responsive only to the energization of said source of low voltage unregulated d-c potential and a second means associated with a second predetermined one of said latching circuits responsive to the energization of both said source of low voltage unregulated d-c potential and said source of regulated d-c potential.

3. The latching system of claim 2 wherein said first means comprises a capacitor connected across said momentary contact touch-button switch associated with said first one of said latching circuits to turn on said switching means in response to energizing said unregulated source of d-c potential and a capacitor connected to said indicator to enhance the action thereof in response to the energization of said unregulated source of d-c potential.

4. The latching system of claim 2 wherein said second means comprises a capacitor connected to said second one of said latching circuits to turn on said switching means in response to the energization of said regulated source of d-c potential.

5. In a latching system for touch-button actuated potentiometers used in the tuning of voltage variable reactance receiver tuners, the combination comprising:

a. a first source of d-c potential, said source having a relatively fast turn-on time and being regulated to provide a substantially fixed output;

b. a second source of d-c potential having a relatively slow turn-on time;

c. a plurality of electronic latching circuits connected to said sources, each latching circuit comprising: a complementary pair of transistors connected together to provide stable on and off latch states, an indicator connected to said transistors and energized from said second source of d-c potential to indicate the state of its associated pair of transistors, said indicator being energizable from said second source of d-c potential, and a potentiometer connected to said transistors and energized from said first source of d-c potential to provide a potentiometer variable output when said on latch state exists; and d. means for actuating a predetermined one only of said latching circuits in response to the difference in turn-on times of said sources when said sources are simultaneously energized.

6. The latching system of claim 5 wherein said actuating means comprises a capacitor connected to said predetermined one of said complementary pair of transistors to turn them on in response to said difference in turn on times.

* * * * *